Patented Sept. 26, 1922.

1,430,034

UNITED STATES PATENT OFFICE.

WALTER O. SNELLING, OF ALLENTOWN, PENNSYLVANIA.

VULCANIZED OIL PRODUCT.

No Drawing. Original application filed May 22, 1915, Serial No. 29,765. Divided and this application filed August 8, 1919. Serial No. 316,022.

*To all whom it may concern:*

Be it known that I, WALTER O. SNELLING, a citizen of the United States, residing at Allentown, in the county of Lehigh and State of Pennsylvania, have invented certain Improvements in Vulcanized Oil Products (being a division of application S. N. 29,765, filed May 22, '15), of which the following is a specification.

The general object of my invention is the preparation of cohesive and plastic masses possessing certain of the general properties of rubber, and capable of being used in part as a substitute thereof, and in part as compounding ingredients, capable when mixed with other substances such as resins, rubber, gutta percha, and like materials, of yielding products having advantageous properties which by vulcanization or other appropriate treatment may be still further modified and changed to yield products having desirable properties of cohesiveness, toughness, elasticity and plasticity.

In my application above referred to, of which this is a division, I have disclosed methods of producing rubber-like products by vulcanizing a vegetable oil under conditions which permit of the later transformation of the original vulcanized product into a tough, cohesive and plastic product, and I have also disclosed a method by which related vulcanized oil products of fluid nature and unique properties may be prepared.

In my said application I disclosed, but did not specifically claim, certain modifications of my general method of preparing plastic vulcanized oil products, and the object of my present application is to cover a modified process of preparing plastic vulcanized oils, and the products obtained through the use of such process.

It has long been known that when a fatty oil is admixed with a small amount of sulfur chloride, a reaction occurs with the production of a body very different in nature from the original oil. The reaction is generally recognized to be very similar to the reaction which occurs when rubber is brought in contact with sulfur chloride.

A comparatively small amount of sulfur chloride is needed to convert a liquid fatty oil into a solid factis, and in the manufacture of vulcanized oils only sufficient sulfur chloride is used to bring about the transformation of the liquid oil into the form of a solid factis of suitable body. Any excess of sulfur chloride over the amount needed to bring about the vulcanization of the oil seems to be retained for a time in the factis in apparently chemically unchanged condition, and if the factis is exposed to the air the excess sulfur chloride causes the factis to fume badly, as moisture in the air reacts with the sulfur chloride. This fuming continues for a number of hours, until finally the excess of sulfur chloride in the factis is lost, in part by evaporation and in part through decomposition by moisture in the air.

Since adding an amount of sulfur chloride to a fatty oil in excess of the amount required to bring about the vulcanization or hardening of the oil has not been hitherto known to lead to any valuable result, factis is always made by adding only such an amount of sulfur chloride as is required to give a sufficiently firm body to the resulting product, and the use of any amount of sulfur chloride in excess of the amount required to bring about vulcanization has naturally been considered to be mere waste, the additional sulfur chloride being subsequently lost through fuming when the factis is exposed to air.

I have discovered that the action of sulfur chloride on a fatty oil is not limited to its vulcanizing action, and that sulfur chloride added to a vulcanizable oil in excess of the amount required to bring about vulcanization has the ability to bring about deep-seated and highly desirable changes in the vulcanized oil product. In order that these changes subsequent to vulcanization should occur however, it is necessary that the sulfur chloride should be retained in contact with the factis for a prolonged period, since the action is a slow one. If factis is made with an excess of sulfur chloride, and is exposed to the air in the ordinary way after its preparation, the excess of sulfur chloride will be lost by evaporation or decomposition in the manner already described, and no effect upon the vulcanized oil will be noticeable, but if instead of permitting the factis to lose the excess of sulfur chloride present in it, care is taken to so confine the factis that the vulcanized oil remains for a long period in the presence of the excess of sulfur chloride, a series of changes will occur, with the gradual breaking down of the size of the molecular aggregates forming the solid and non-plastic factis, with the ultimate production of soft and highly plastic materials wholly unlike ordinary factis. These products are not of permanent nature however, since the retained sulfur chloride seems capable of continuing its action of breaking down the size of the molecular aggregates, until finally the factis will be reduced to ultimate decomposition products of little or no commercial value. Accordingly, to prepare valuable products I interrupt the action of the sulfur chloride in breaking down the vulcanized oil as soon as the action has gone sufficiently far to produce materials of the desired consistency, and I then prevent any further action by removing or destroying the excess of sulfur chloride which is still present.

In practicing my present invention I first prepare factis by vulcanizing an oil with sulfur chloride, using an excess of sulfur chloride over the amount required to bring about the solidification of the oil to factis. In this step of my process I may simply mix together a fatty oil and sulfur chloride in proper amounts, or I may mix together a suitable amount of sulfur chloride and a fatty oil in the presence of a diluent such as benzine, carbon bisulfide, or gasoline. Or I may mix together a fatty oil, a diluent, an excess of sulfur chloride, and an agent which has the ability to accelerate the action of the excess of sulfur chloride in the breaking down of the molecular aggregates of the factis in the subsequent stages of my process. As an example of a suitable accelerating agent I may mention hydroxystearic acid. While I do not fully know the chemical reactions by which such an accelerating agent acts to assist in the breaking down of the molecular aggregates of factis, yet I have experimentally found such materials to have a marked influence on the resulting reactions and I have discovered that a much smaller excess of sulfur chloride is sufficient to bring about the desired chemical changes in the subsequent steps of my process, if a hydroxyl fatty acid or other accelerator is present. It should be made clear, however, that the presence of such an accelerator is not a necessary part of my invention, and that perfectly satisfactory plastic products may be produced when no accelerating agent is added. It is sometimes an advantage however, to use such an accelerating agent, because then it is possible to produce plastic products in the subsequent steps of my process in the presence of a much smaller excess of sulfur chloride than would otherwise be the case.

Having prepared in the manner described, a vulcanized oil product or factis which contains an excess of sulfur chloride over that required for vulcanization, I next confine such factis in such a way as to prevent the excess of sulfur chloride which is present from escaping. Preferably I place the factis in a container which may be hermetically closed. A change, at first very slow, but soon becoming more rapid and active, then goes on, and the solid factis becomes at first "wilted" and soft, as the size of the molecular aggregates becomes successively smaller. This change seems to be due less to the excess of sulfur chloride which is actually retained in the factis as liquid sulfur chloride than it does to the vapors of sulfur chloride which of course soon form in the enclosed space. I do not know the reason for this phenomenon, but I have assumed that the absorbed or dissolved sulfur chloride might possibly represent too high a concentration, so that the vulcanizing action of the sulfur chloride still predominates over its depolymerizing action, while the sulfur chloride after vaporizing into the open space around the particles of factis exerted a milder action, in which the depolymerizing influence was stronger than the vulcanizing or polymerizing influence. Whatever the theory of the case may be, practical experiments show that vaporous sulfur chloride acts on factis to bring about a much more rapid and much more satisfactory depolymerization than when the excess of sulfur chloride is merely retained in the factis without permitting sulfur chloride in the vapor phase to also be present as a reagent. The action of the excess of sulfur chloride on the factis may be interrupted when a test sample removed from the container shows the material to be suitably soft, or the reaction may be allowed to go on until the factis is completely reduced to a liquid condition by the breaking down of the molecular aggregates to a relatively small size.

It is of course not necessary to my invention that the excess of sulfur chloride should be present in the factis at the time the factis is made. Factis can be made by mixing sulfur chloride with such an amount of a fatty oil that no excess of sulfur chloride over that required to vulcanize the oil is present, and the factis so made may then be brought in contact with an additional quantity of sulfur chloride or sulfur chloride vapors. Under these conditions sulfur chloride will be present in excess of the amount required for vulcanization, just the same as if the excess of sulfur chloride had been added at the time the oil was vulcanized, and it is immaterial to my invention whether the excess of sulfur chloride is originally present in my factis, or whether additional sulfur chloride is later added for the purpose of bringing about the depolymerizing action which I find to be due to the reaction of sulfur chloride on factis, when such sulfur chloride is present in excess of the amount required for vulcanization.

When the vulcanized oil has been depolymerized to a satisfactory degree, I interrupt further polymerizing action, and remove any excess of sulfur chloride which may be present. Preferably I wash the product in water, since water reacts with sulfur chloride and destroys its chemical identity. I may achieve a similar result by blowing air or any inert gas over my factis to volatilize the excess of sulfur chloride, or I may use steam, or a dilute solution of an alkali. In every case the result is the removal of any sulfur chloride which may still be present so that this sulfur chloride cannot continue its action on the oil product remaining at this stage of the process.

The finished product obtained as the result of the steps already described is very different from ordinary factis, and possesses the power of cohesion or self-adhesion to a very remarkable extent. When two pieces of ordinary factis are pressed together there is no tendency for the two surfaces in contact to merge together, but when two samples of my new product are brought together they merge completely, and on endeavoring to separate them the molecular attractions in the zone at which contact originally took place seem equally strong with the molecular attraction in all other portions of the material. This is a characteristic of well masticated caoutchouc or raw rubber, but is shown by few other bodies of tough and plastic nature, and it is this and other related characteristics which give to my new products their interest and their commercial value.

From the foregoing statement it will be evident that the range of modifications which may be effected in my process is very great. My invention should therefore not be considered as being limited to the specific illustrations given, but should be understood to cover all equivalents of the materials and methods that have been specifically mentioned, and no limitations are to be imposed upon my invention except such as are indicated in the appended claims.

I claim as my invention:

1. The process which comprises reacting upon a fatty oil with sulfur chloride in excess of the amount required to produce vulcanization.

2. The process of producing vulcanized oil products which comprises reacting upon a fatty oil with sulfur chloride in excess of the amount required to produce vulcanization.

3. The process of producing vulcanized oil products which comprises reacting upon a fatty oil with sulfur chloride in excess of the amount required to produce vulcanization, and thereafter bringing the resulting product into contact with water.

4. The process which comprises confining together about 30 parts of factis and about 20 parts of sulfur chloride, allowing the materials to remain together for about 48 hours at a temperature of about 18° C., and kneading the resulting viscous fluid with water for from 10 min. to 20 min.

5. A factis-like vulcanized oil product containing a substance that is capable of assisting in the depolymerization of the said product.

6. The plastic and cohesive product prepared by acting on a fatty oil with sulfur chloride in excess of the amount required to produce vulcanization.

In testimony whereof, I have hereunto subscribed my name this 7th day of August, 1919.

WALTER O. SNELLING.